United States Patent
Woo et al.

(10) Patent No.: US 10,241,246 B2
(45) Date of Patent: Mar. 26, 2019

(54) COLOR FILTER ARRAY PANEL AND A DISPLAY DEVICE INCLUDING THE SAME

(71) Applicant: SAMSUNG DISPLAY CO., LTD., Yongin-si, Gyeonggi-do (KR)

(72) Inventors: Jun Hyuk Woo, Seongnam-si (KR); Seung Bo Shim, Asan-si (KR); Kwang Woo Park, Hwaseong-si (KR); Gwui-Hyun Park, Hwaseong-si (KR); Jin Ho Ju, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 24 days.

(21) Appl. No.: 15/465,762

(22) Filed: Mar. 22, 2017

(65) Prior Publication Data

US 2017/0276845 A1   Sep. 28, 2017

(30) Foreign Application Priority Data

Mar. 22, 2016   (KR) .................. 10-2016-0034177

(51) Int. Cl.
  *G02F 1/1335*   (2006.01)
  *G02B 5/22*    (2006.01)
  (Continued)

(52) U.S. Cl.
  CPC ............ *G02B 5/223* (2013.01); *G02B 5/201* (2013.01); *G02F 1/1337* (2013.01);
  (Continued)

(58) Field of Classification Search
  CPC .................................................. G02F 1/1337
  See application file for complete search history.

(56) References Cited

U.S. PATENT DOCUMENTS

| 2011/0157526 A1* | 6/2011 | Shibata ............. G02F 1/136227 349/96 |
| 2014/0098315 A1* | 4/2014 | Jung ................. G02F 1/136209 349/42 |
| 2014/0313463 A1* | 10/2014 | Jang ................. G02F 1/136209 349/106 |
| 2016/0274428 A1* | 9/2016 | Kim ................. G02F 1/136209 |
| 2016/0370648 A1* | 12/2016 | Yao ...................... G02F 1/1335 |

FOREIGN PATENT DOCUMENTS

| JP | 3236576 | 9/2001 |
| JP | 2014-048621 | 3/2014 |

(Continued)

*Primary Examiner* — Edmond C Lau
(74) *Attorney, Agent, or Firm* — F. Chau & Associates, LLC

(57) ABSTRACT

A color filter array panel and a display device including the same are provided. The color filter array panel includes a substrate; a first pixel and a second pixel disposed adjacent to each other; a data line disposed on the substrate and between the first pixel and the second pixel; a first color filter disposed in the first pixel; a second color filter disposed in the second pixel, the first color filter and the second color filter overlap each other to form a color filter overlapped portion overlapping the data line; an inorganic layer disposed on the color filter overlapped portion; an organic layer disposed on the inorganic layer, the first color filter, and the second color filter; and a first pixel electrode disposed in the first pixel; and a second pixel electrode disposed in the second pixel The inorganic layer is disposed between the first pixel electrode and the second pixel electrode.

15 Claims, 6 Drawing Sheets

(51) Int. Cl.
   *G02F 1/1337*    (2006.01)
   *G02F 1/1343*    (2006.01)
   *G02F 1/1368*    (2006.01)
   *G02B 5/20*      (2006.01)
   *G02F 1/1362*    (2006.01)

(52) U.S. Cl.
   CPC ...... *G02F 1/1368* (2013.01); *G02F 1/133512* (2013.01); *G02F 1/133514* (2013.01); *G02F 1/134309* (2013.01); *G02F 1/136286* (2013.01); *G02F 2001/133519* (2013.01); *G02F 2001/136222* (2013.01); *G02F 2201/123* (2013.01); *G02F 2201/501* (2013.01)

(56) References Cited

FOREIGN PATENT DOCUMENTS

| KR | 10-1994-0000881 | 1/1994 |
|---|---|---|
| KR | 10-0412275 | 12/2003 |
| KR | 10-2005-0043220 | 5/2005 |
| KR | 10-2005-0043221 | 5/2005 |
| KR | 10-2005-0049986 | 5/2005 |
| KR | 10-2006-0024939 | 3/2006 |
| KR | 10-0616396 | 8/2006 |
| KR | 10-2007-0004310 | 1/2007 |
| KR | 10-2008-0055058 | 6/2008 |
| KR | 10-2008-0060401 | 7/2008 |
| KR | 10-1122234 | 2/2012 |
| KR | 10-2014-0086395 | 7/2014 |
| KR | 10-2014-0098401 | 8/2014 |
| KR | 10-2015-0031640 | 3/2015 |

\* cited by examiner

COLOR FILTER ARRAY PANEL AND A DISPLAY DEVICE INCLUDING THE SAME

CROSS-REFERENCE TO RELATED APPLICATION

This application claims priority under 35 U.S.C. § 119 to Korean Patent Application No. 10-2016-0034177 filed in the Korean Intellectual Property Office on Mar. 22, 2016, the disclosure of which is incorporated by reference herein in its entirety.

TECHNICAL FIELD

Exemplary embodiments of the present invention relate to a color filter array panel, and more particularly to a display device including the same.

DISCUSSION OF RELATED ART

A liquid crystal display (LCD) is a type of flat panel display. The LCD display includes electric field generation electrodes, for example, a pixel electrode and a common electrode, that are configured to generate an electric field. The LCD includes two display panels. The two display panels are disposed with a gap therebetween. The LCD also includes a liquid crystal layer. The liquid crystal layer is disposed between the two display panels and is configured to fill the gap. In such an LCD, the electric filed is generated in the liquid crystal layer by applying a voltage to the two electric field generation electrodes. Thus, an alignment direction of liquid crystal molecules is determined and a polarization of incident light is controlled in order to display an image.

The liquid crystal display includes the electric field generation electrodes, a plurality of thin film transistors, a plurality of pixels, and a plurality of signal lines. The thin film transistors are connected to the electric field generation electrodes. The pixels are arranged in a matrix format. The signal lines are configured to transmit signals to the pixels. The signal lines include gate lines and data lines. The gate lines are configured to transmit scan signals. The data lines are configured to transmit data signals. Each pixel includes a color filter. The liquid crystal display further includes the color filter that displays a color, in addition to each of the field generating electrode and the thin film transistor.

The gate line, the data line, the pixel electrode, and the thin film transistor are each disposed on a side of the two display panels. The color filter may be disposed in the same display panel where the thin film transistor is disposed. Alternatively, the color filter may be disposed in the display panel where the thin film transistor is not disposed.

When a thickness of an overcoat that is configured to cover the color filter is relatively thin, ions may be dispersed from each of the color filter and the alignment layer. Thus, the color filter and the alignment layer may be contaminated due to the ion dispersion. When the alignment layer is contaminated, alignment of the liquid crystal molecules may be irregular. Thus, a deterioration of a display quality of the LCD device may occur.

SUMMARY

One or more exemplary embodiments of the present invention provide a color filter array panel. The color filter array panel includes a substrate, a first pixel, a second pixel, a data line, a first color filter, a second color filter, an inorganic layer, an organic layer, a first pixel electrode, and a second pixel electrode. The first pixel and the second pixel are adjacent to each other. The data line is on the substrate and between the first pixel and the second pixel. The first color filter is in the first pixel. The second color filter is in the second pixel. The first color filter and the second color filter overlap each other in a color filter overlapped portion. The color filter overlapped portion overlaps the data line. The inorganic layer is on the color filter overlapped portion. The organic layer is on each of the inorganic layer, the first color filter, and the second color filter. The first pixel electrode and the second pixel electrode are on the organic layer. The first pixel electrode is in the first pixel. The second pixel electrode is in the second pixel. The inorganic layer is between the first pixel electrode and the second pixel electrode.

A first thickness of a first portion of the organic layer overlapping each of the first pixel electrode and the second pixel electrode may be larger than a second thickness of a second portion of the organic layer overlapping the color filter overlapped portion.

The inorganic layer may include a silicon oxide ($SiO_x$), a silicon nitride ($SiN_x$), tetraethyl orthosilicate (TEOS), or any combination thereof.

The organic layer may include an acryl-based resin, a siloxane resin, or any combination thereof.

The color filter array panel may further include an alignment layer. The alignment layer may be on each of the pixel electrodes and the organic layer.

One or more exemplary embodiments of the present invention provide a display device. The display device includes a first display panel, a second display panel, and a liquid crystal layer. The second display panel faces the first display panel. The liquid crystal layer is between the first display panel and the second display panel. The first display panel includes a substrate, a data line, a first color filter, a second color filter, an inorganic layer, an organic layer, a first pixel electrode, and a second pixel electrode. The data line is on the substrate. The first color filter and the second color filter are on the substrate. The first color filter is disposed in a first pixel. The second color filter is in a second pixel. The first pixel and the second pixel are adjacent to each other. The data line is between the first pixel and the second pixel. The first color filter and the second color filter overlap each other in a color filter overlapped portion. The color filter overlapped portion overlaps the data line. The inorganic layer is on the color filter overlapped portion. The organic layer is on each of the inorganic layer, the first color filter, and the second color filter. The first pixel electrode and a second pixel electrode are on the organic layer. The first pixel electrode is in the first pixel. The second pixel electrode is in the second pixel. The inorganic layer is between the first pixel electrode and the second pixel electrode.

The display device may further include a first alignment layer and a second alignment layer. The first alignment layer may be between the first display panel and the liquid crystal layer. The second alignment layer may be between the second display panel and the liquid crystal layer.

A first thickness of a first portion of the organic layer overlapping each of the first pixel electrode and the second pixel electrode may be larger than a second thickness of a second portion of the organic layer overlapping the color filter overlapped portion.

The inorganic layer may include a silicon oxide ($SiO_x$), a silicon nitride ($SiN_x$), tetraethyl orthosilicate (TEOS), or any combination thereof.

The organic layer may include an acryl-based resin, a siloxane resin, or any combination thereof.

One or more exemplary embodiments of the present invention provide a color filter array panel comprising: a substrate; a first pixel and a second pixel adjacent to each other; a first color filter in the first pixel; a second color filter in the second pixel, the first color filter and the second color filter overlapping each other in a color filter overlapped area; an inorganic layer on the second color filter in the color filter overlapped area; an organic layer on the inorganic layer, the first color filter, and the second color filter; a first pixel electrode in the first pixel and a second pixel electrode in the second pixel, wherein a first thickness of a first portion of the organic layer overlapping each of the first pixel electrode and the second pixel electrode is larger than a second thickness of a second portion of the organic layer in the color filter overlapped area.

The organic layer comprises the color filter array panel, wherein the inorganic layer comprises an inorganic insulating material.

The organic layer comprises the color filter array panel, wherein the organic layer comprises an acryl-based resin, or a siloxane resin.

The organic layer comprises the color filter array panel further comprising a data line between the first pixel and the second pixel.

The organic layer comprises the color filter array panel, wherein the data line is included in the color filter overlapped area.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION OF THE EMBODIMENTS

Figure 1:
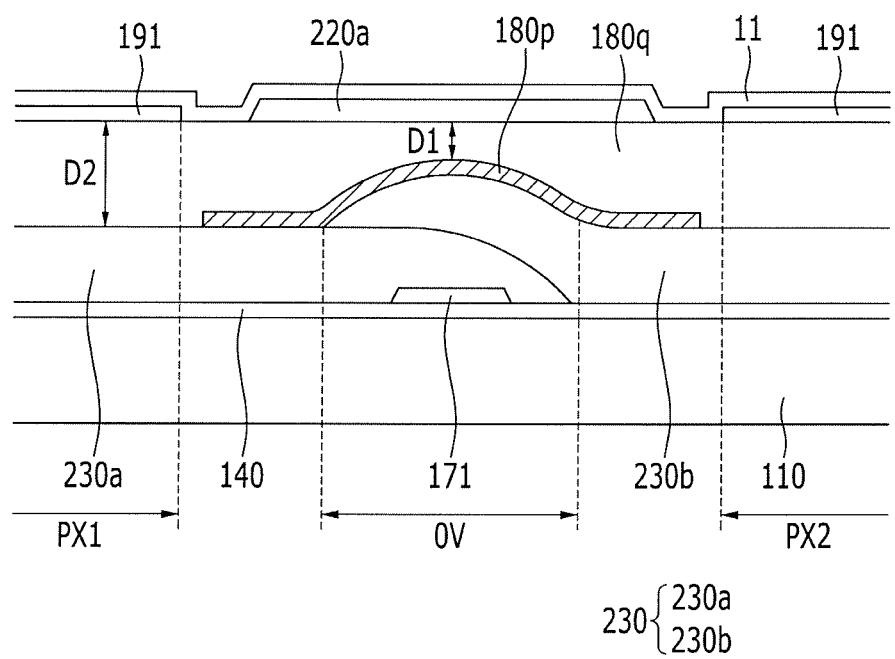
FIG. 1 is a cross-sectional view of a color filter array panel according to an exemplary embodiment.

Exemplary embodiments of the present invention will be described below in more detail hereinafter with reference to the accompanying drawings. In this regard, the exemplary embodiments may have different forms and should not be construed as being limited to the exemplary embodiments of the present invention described herein.

Like reference numerals may refer to like elements throughout the specification and drawings.

It will be understood that when an element such as a layer, film, region, or substrate is referred to as being "on" another element, it can be directly on the other element or intervening elements may also be present.

In this specification, the phrase "on a plane" may indicate viewing a target portion from the top. The phrase "on a cross-section" may indicate viewing a cross-section formed by vertically cutting a target portion from the side.

Further, the term "thickness" may indicate a height in a direction that is substantially perpendicular with reference to a wide plane.

A color filter array panel according to an exemplary embodiment of the present invention will be described in more detail below with reference to FIG. 1.

FIG. 1 is a cross-sectional view illustrating a color filter array panel according to an exemplary embodiment of the present invention.

Referring to FIG. 1, a color filter array panel may include a first pixel PX1 and a second pixel PX2. The first pixel PX1 and the second pixel PX2 may be disposed adjacent to each other.

Each of the first pixel PX1 and the second pixel PX2 may be an area that overlaps a pixel electrode 191. The first pixel PX1 and the second pixel PX2 will be described in more detail below.

A gate insulating layer 140 may be disposed on a first substrate 110. A data line 171 may be disposed on the gate insulating layer 140.

The data line 171 may be disposed between the first pixel PX1 and the second pixel PX2. The first pixel PX1 and the second pixel PX2 may be adjacent to each other.

A first color filter 230a may be disposed on the first pixel PX1. A second color filter 230b may be disposed on the second pixel PX2.

A color filter overlapped portion OV may be disposed on the data line 171. The first color filter 230a of the first pixel PX1 and the second color filter 230b of the second pixel PX2 may overlap each other in the color filter overlapped portion OV of the color filter array panel.

The color filter overlapped portion OV may be disposed between the first pixel PX1 and the second pixel PX2. The first pixel PX1 and the second pixel PX2 may be adjacent to each other.

Since the first color filter 230a and the second color filter 230b may overlap each other in the color filter overlapped portion OV, a thickness of the color filter overlapped portion OV may be greater than each of a thickness of the first color filter 230a of the first pixel PX1 and a thickness of the second color filter 230b of the second pixel PX2.

An inorganic layer 180p may be disposed on the color filter overlapped portion OV.

The inorganic layer 180p may overlap each of the data line 171 and the color filter overlapped portion OV along an extension direction of the data line 171. The inorganic layer 180p might not be disposed on each of the first pixel PX1 and the second pixel PX2.

The inorganic layer 180p may include an inorganic insulating material. The inorganic layer 180p may include a silicon oxide ($SiO_x$), a silicon nitride ($SiN_x$), a tetraethyl orthosilicate (TEOS), or any combinations thereof.

An organic layer 180q may be disposed on each of the inorganic layer 180p disposed on the color filter overlapped portion OV, the first color filter 230a, and the second color filter 230b. The organic layer 180q may include a transparent organic insulating material. The organic layer 180q may reduce or prevent each of the first color filter 230a and the second color filter 230b from being exposed to the outside. The organic layer 180q may also provide a substantially flat surface.

The organic layer 180q may include an acryl-based resin or a siloxane resin.

A pixel electrode 191 may be disposed on the organic layer 180q. The pixel electrode 191 may include a transparent conductive material, such as indium tin oxide (ITO) or indium zinc oxide (IZO). Alternatively, the pixel electrode 191 may include a reflective metal such as aluminum (Al), silver (Ag), chromium (Cr), or an alloy thereof.

A first light blocking member 220a may be disposed on the organic layer 180q, for example, in an area that corresponds to the color filter overlapped portion OV. The first light blocking member 220a in the area that corresponds to the color filter overlapped portion OV may reduce or prevent light leakage that may occur at a periphery of the data line 171.

A first alignment layer 11 may be disposed on each of the pixel electrode 191, the organic layer 180q, and the first light blocking member 220a. The first alignment layer 11 may be a substantially vertical alignment layer. Alternatively, the first alignment layer 11 may be a substantially horizontal alignment layer.

The first alignment layer 11 may include polyamic acid (PAA) or polyimide (PI).

Since the thickness of the color filter overlapped portion OV may be greater than each of the thickness of the first color filter 230a of the first pixel PX1 and the thickness of the second color filter 230b of the second pixel PX2, a thickness of the organic layer 180q having a substantially flat surface may be changed depending on a location.

For example, a first thickness D1 of the organic layer 180q may be thinner than a second thickness D2 of the organic layer 180q. The first thickness D1 may be an area that corresponds to the color filter overlapped portion OV. The second thickness D2 of the organic layer 180q may be an area that corresponds to each of the first pixel PX1 and the second pixel PX2.

Potassium ions (K$^+$) included in each of the first and second color filters 230a and 230b may be respectively included in the first and second pixels PX1 and PX2. Since the organic layer 180q may have a relatively thick second thickness D2, the potassium ions may be reduced or prevented from being dispersed to the outside of the organic layer 180q. However, since the organic layer 180q disposed above the color filter overlapped portion OV may have a relatively thin first thickness D1, potassium ions (K$^+$) included in each of the color filter 230 of the color filter overlapped portion OV may be dispersed to the outside of the organic layer 180q.

Eluted potassium ions (K$^+$) may disperse to the first alignment layer 11 disposed on the organic layer 180q. The first alignment layer 11 may be contaminated due to the dispersed potassium ions. When the first alignment layer 11 is contaminated, an initial alignment of liquid crystal molecules of a liquid crystal layer may be irregular. When the liquid crystal molecules have the irregular initial alignment, a display quality of the display device may deteriorate.

According to an exemplary embodiment of the present invention, the color filter array panel may include the inorganic layer 180p disposed between the color filter overlapped portion OV and the organic layer 180q that is disposed on the color filter overlapped portion OV. Thus, potassium ions (K$^+$) included in the color filter 230 of the color filter overlapped portion OV corresponding to a relatively thin portion of the organic layer 180q may be prevented from passing through the organic layer 180q and dispersing to the outside of the organic layer 180q.

A distribution of potassium ions (K$^+$) of a color filter array panel according to a comparative example will be described in detail with reference to FIGS. 2A and 2B.

Figure 2A:
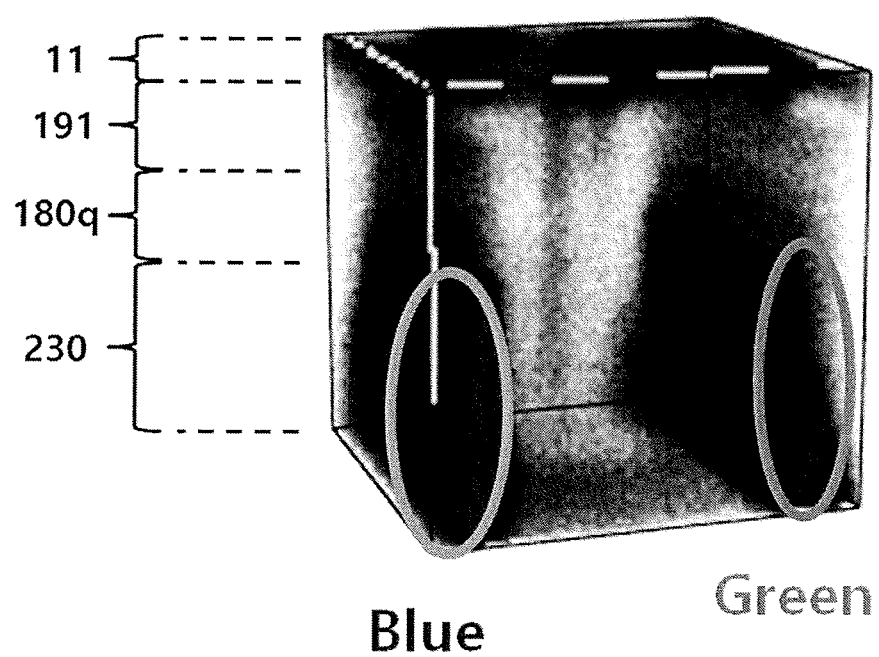
FIG. 2A and FIG. 2B are results of measurement of potassium ion distribution by position of a color filter included in a color filter array panel using time of flight secondary ion mass spectrometry (TOF_SIMS) according to a comparative example.
Figure 2B:
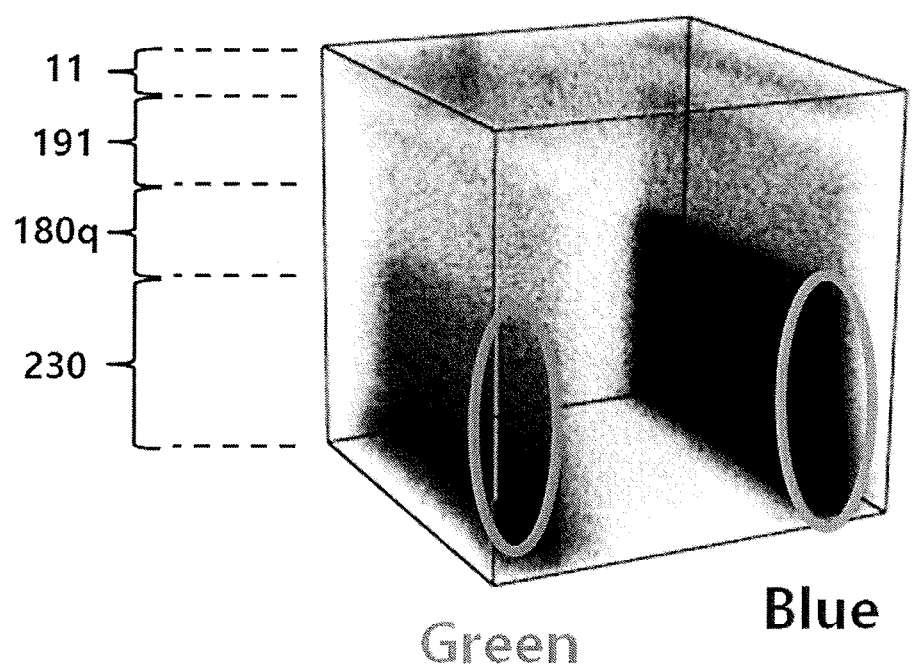

FIGS. 2A and 2B illustrate results of measurement of potassium ion distribution by position of a color filter of a color filter array panel using time of flight secondary ion mass spectrometry (TOF_SIMS) according to a comparative example.

Referring to FIGS. 2A and 2B, a distribution of potassium ions (K$^+$) was measured using time of flight secondary ion mass spectrometry (TOF-SIMS), with respect to a first case and a second case. The first case includes two color filters overlapped with each other. The second case includes a single color filter. Other variable conditions other than overlapping the color filters are substantially the same.

FIG. 2A illustrates a potassium ion distribution of the first case, in which two color filters are overlapped with each other. FIG. 2B illustrates a potassium ion distribution of the second case, in which a single color filter is provided.

Referring to FIG. 2A, when two color filters 230 overlap with each other, potassium ions (K$^+$) exist in each of the organic layer 180q, the pixel electrode 191, and the first alignment layer 11.

Referring to FIG. 2B, when a single color filter 230 is provided, potassium ions (K$^+$) are not distributed through the organic layer 180q. Thus, potassium ions exist in the color filter 230.

When adjacent color filters 230 overlapped each other and an organic layer 180q disposed above the color filters 230 is relatively thin, potassium ions (K$^+$) may be distributed to the first alignment layer 11.

According to an exemplary embodiment of the present invention, the color filter array panel may include the inorganic layer 180p disposed between the color filter overlapped portion OV and the organic layer 180q disposed on the color filter overlapped portion OV. Thus, potassium ions (K$^+$) included in the color filter 230 of the color filter overlapped portion OV that corresponds to a relatively thin portion of the organic layer 180q may be reduced or prevented from passing through the organic layer 180q and dispersing to the outside of the organic layer 180q. Since the dispersion of the potassium ions (K$^+$) to the alignment layer may be reduced or prevented, an alignment failure of the liquid crystal molecules may be reduced or prevented.

The inorganic layer 180p may be disposed between the first pixel PX1 and the second pixel PX2. The first pixel PX1 and the second pixel PX2 may be adjacent to each other. Thus, the inorganic layer 180p might not overlap the pixel electrode 191 disposed on each of the first pixel PX1 and the second pixel PX2.

When the inorganic layer 180p is disposed on the entire surface of the substrate 110, a transmittance of light emitted from a backlight may be deteriorated while passing through each of the inorganic layer 180p and the organic layer 180q which have different refractive indexes.

According to an exemplary embodiment of the present invention, the inorganic layer 180p might not be provided throughout the substrate 110. The inorganic layer 180p may be disposed in a portion overlapped with the color filter overlapped portion OV. The inorganic layer 180p may be disposed only_in the portion that overlaps the color filter overlapped portion OV. Thus, the inorganic layer 180p might not be provided in a portion where the pixel electrode 191 of the first pixel PX1 and the pixel electrode 191 of the second pixel PX2 are disposed. Thus, a transmittance deterioration of light generated from each of the first pixel PX1 and the second pixel PX2 that display an image may be reduced or prevented.

The inorganic layer 180p may be disposed in the portion that overlaps the color filter overlapped portion OV. The inorganic layer 180p might not be provided in the portions where the pixel electrodes 191 are disposed. Accordingly, dispersion of potassium ions (K⁺) to the alignment layer from the color filter 230 and a deterioration of light transmittance may each be reduced or prevented.

Figure 3:
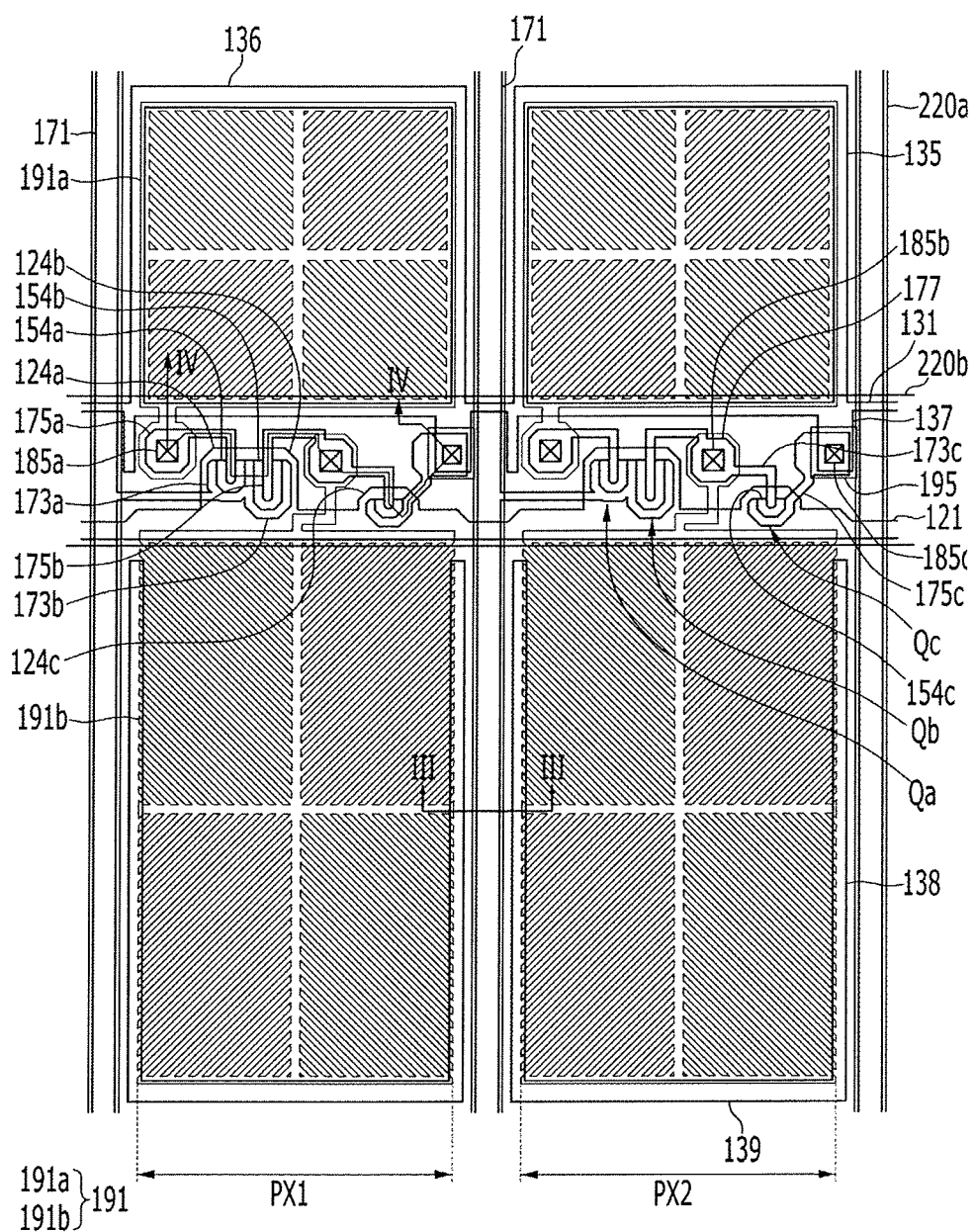
FIG. 3 is a layout view of pixels of a display device according to an exemplary embodiment.
Figure 4:
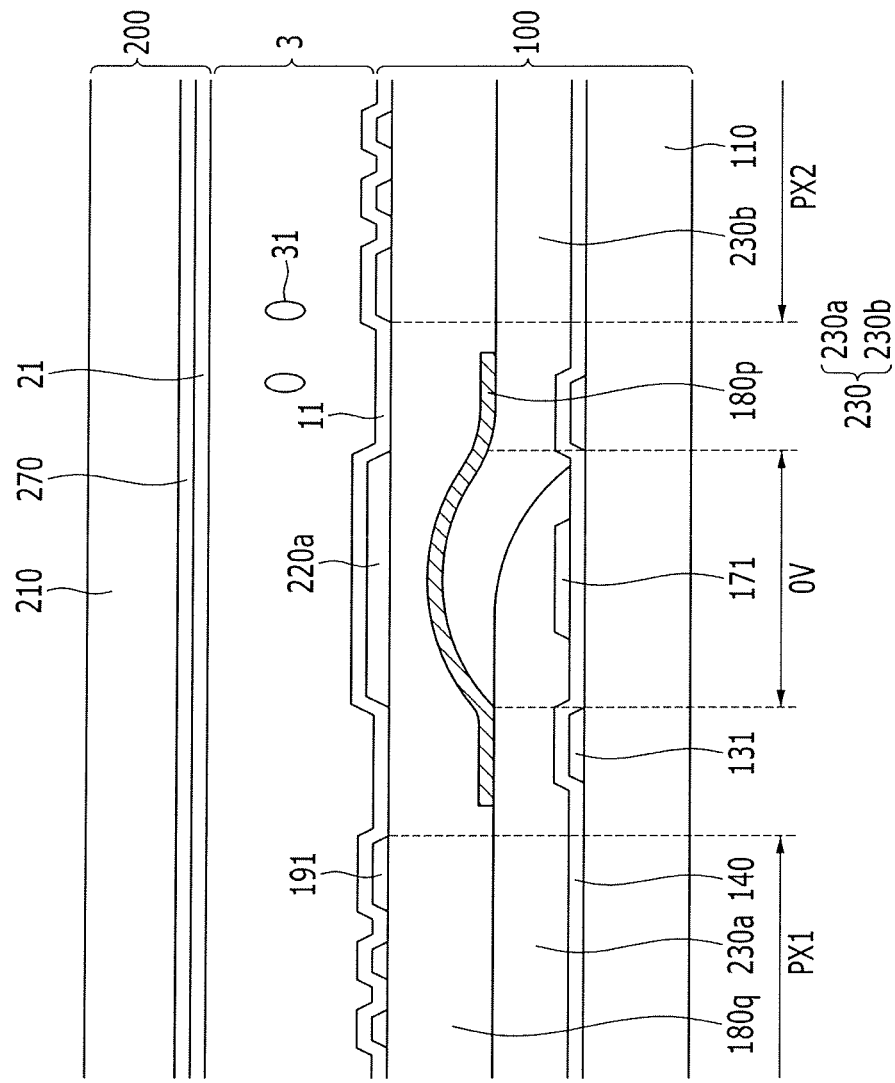
FIG. 4 is a cross-sectional view taken along a line III-Ill of FIG. 3.
Figure 5:
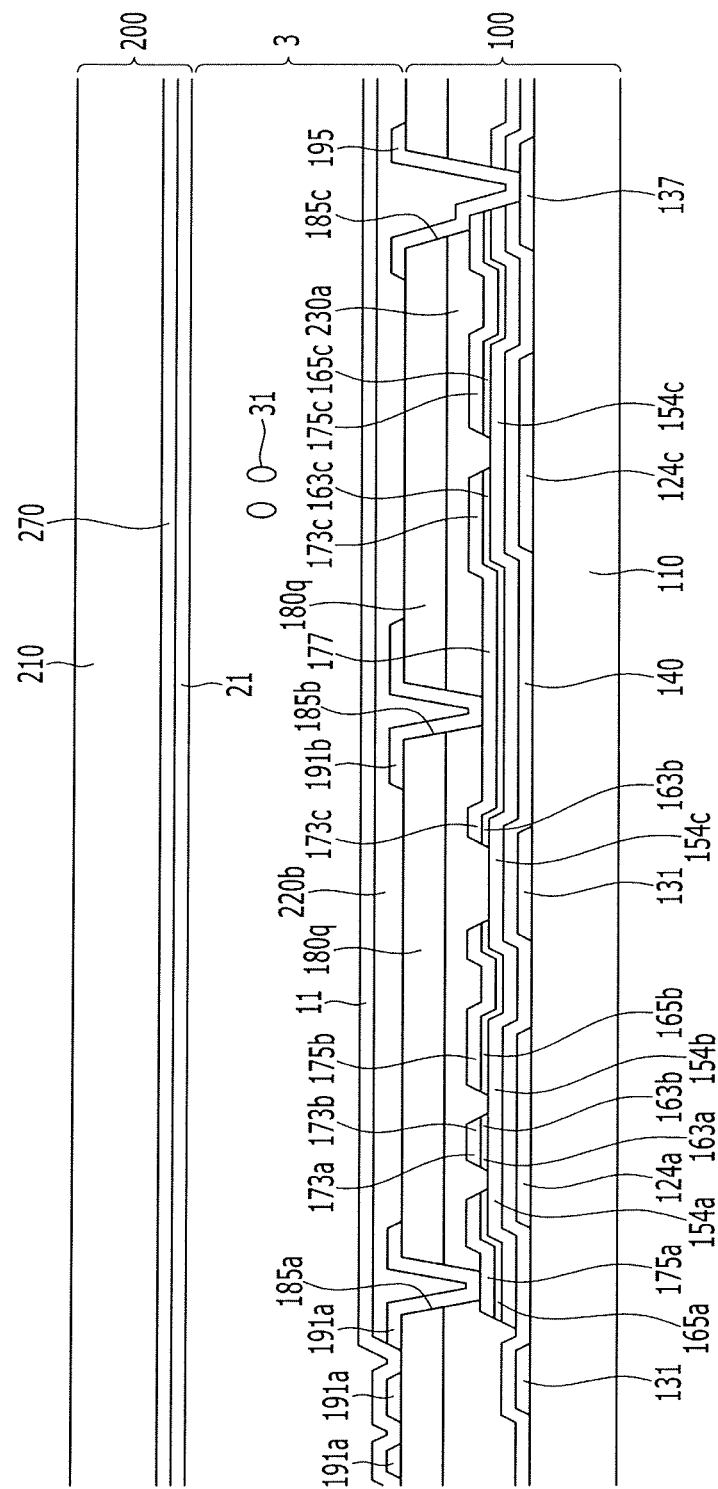
FIG. 5 is a cross-sectional view taken along a line IV-IV of FIG. 3.

Referring to FIGS. 3 to 5, a liquid crystal display according to an exemplary embodiment of the present invention will be described in detail below.

FIG. 3 is a layout view illustrating pixels of a display device according to an exemplary embodiment of the present invention. FIG. 4 is a cross-sectional view taken along a line III-Ill of FIG. 3 according to an exemplary embodiment of the present invention. FIG. 5 is a cross-sectional view taken along a line IV-IV of FIG. 3 according to an exemplary embodiment of the present invention.

The liquid crystal display may include a first display panel 100, a second display panel 200, and a liquid crystal layer 3. The liquid crystal layer 3 may be disposed between the first display panel 100 and the second display panel 200.

The first display panel 100 will be described in more detail below.

A gate conductor may be disposed on a first substrate 110. The gate conductor may include a gate line 121 and a storage electrode line 131. The first substrate 110 may include transparent glass or plastic.

The gate line 121 may include a first gate electrode 124a, a second gate electrode 124b, a third gate electrode 124c, and a wide end portion. The wide end portion may be configured to provide a connection with another layer or an external driving circuit.

The storage electrode line 131 may include a plurality of first sustain electrodes 135 and 136 and a reference electrode 137. A plurality of second storage electrodes 138 and 139 may be provided. The second storage electrodes 138 and 139 may overlap a second sub-pixel electrode 191b. The second storage electrodes 138 and 139 might not be connected to the storage electrode line 131. The second storage electrodes 138 and 139 may be connected with the first storage electrodes 135 and 136 of a pixel that is adjacent therebelow.

A gate insulating layer 140 may be disposed on each of the gate line 121 and the storage electrode line 131.

A first semiconductor 154a, a second semiconductor 154b, and a third semiconductor 154c may be disposed on the gate insulating layer 140.

A plurality of ohmic contacts 163a, 165a, 163b, 165b, 163c, and 165c may be disposed on the first to third semiconductors 154a, 154b, and 154c. The ohmic contacts 163a and 165a may be disposed on the first semiconductor 154a. The ohmic contacts 163b and 165b may be disposed on the second semiconductor 154b. The ohmic contacts 163c and 165c may be disposed on the third semiconductor 154c.

A plurality of data lines 171 may be disposed on each of the ohmic contacts 163a, 165a, 163b, 165b, 163c, and 165c and the gate insulating layer 140. The data lines 171 may include a first source electrode 173a, a second source electrode 173b, and a data conductor. The data conductor may include a first drain electrode 175a, a second drain electrode 175b, a third source electrode 173c, and a third drain electrode 175c.

The data line 171 may includes a wide end portion. The wide end portion may be configured to provide a connection with another layer or an external driving circuit.

The first gate electrode 124a, the first source electrode 173a, and the first drain electrode 175a may form a first thin film transistor (TFT) Qa with the first semiconductor 154a. A channel of the first TFT Qa may be disposed in the first semiconductor 154a. The channel of the first TFT Qa may be disposed between the first source electrode 173a and the first drain electrode 175a. The second gate electrode 124b, the second source electrode 173b, and the second drain electrode 175b may form a second TFT Qb with the second semiconductor 154b. A channel of the second TFT Qb may be disposed in the second semiconductor 154b. The channel of the second TFT Qb may be disposed between the second source electrode 173b and the second drain electrode 175b. The third gate electrode 124c, the third source electrode 173c, and the third drain electrode 175c may form a third TFT Qc with the third semiconductor 154c. A channel of the third TFT Qc may be disposed in the third semiconductor 154c. The channel of the third TFT Qc may be disposed between the third source electrode 173c and the third drain electrode 175c.

The second drain electrode 175b may be connected to the third source electrode 173c. The second drain electrode 175b may include a wide expanded expansion portion 177.

A color filter 230 may be disposed on a plurality of data conductors 171, 173c, 175a, 175b, and 175c. The color filter 230 may also be disposed on exposed portions of the first to third semiconductors 154a, 154b, and 154c. The color filter 230 may extend vertically along two adjacent data lines 171.

The data line 171 may be disposed between the first pixel PX1 and the second pixel PX2. The first pixel PX1 and the second pixel PX2 may be adjacent to each other.

The first color filter 230a may be disposed on the first pixel PX1. The second color filter 230b may be disposed on the second pixel PX2.

The color filter overlapped portion OV may be disposed on the data line 171. The color filter overlapped portion OV may be an area in which the first color filter 230a of the first pixel PX1 and the second color filter 230b of the second pixel PX2 are disposed.

The color filter overlapped portion OV may be disposed between the first pixel PX1 and the second pixel PX2. The first pixel PX1 and the second pixel PX2 may be adjacent to each other.

Since the first color filter 230a and the second color filter 230b may overlap in the color filter overlapped portion OV, a thickness of the color filter overlapped portion OV may be thicker than each of a thickness of the first color filter 230a of the first pixel PX1 and a thickness of the second color filter 230b of the second pixel PX2.

The inorganic layer 180p may be disposed on the color filter overlapped portion OV.

The inorganic layer 180p may overlap each of the data line 171 and the color filter overlapped portion OV along an extension direction of the data line 171. The inorganic layer 180p might not be provided on the first and second pixels PX1 and PX2.

The inorganic layer 180p may include an inorganic insulating material. The inorganic layer 180p may include a silicon oxide ($SiO_x$), a silicon nitride ($SiN_x$), tetraethyl orthosilicate (TEOS), or any combination thereof.

The organic layer 180q may be disposed on each of the first color filter 230a, the second color filter 230b, and the inorganic layer 180p disposed on the color filter overlapped portion OV. The organic layer 180q may include a transparent organic insulating material. The organic layer 180q may reduce or prevent each of the first color filter 230a and the second color filter 230b from being exposed. The organic layer 180q may provide a substantially flat surface.

The organic layer 180q may include an acryl-based resin or a siloxane resin. The inorganic layer 180p and the organic layer 180q may each prevent a failure from occurring during screen driving by suppressing contamination of the liquid crystal layer 3. Contamination of the liquid crystal layer 3 may be suppressed by an organic material such as a solvent.

The organic material may be injected into the liquid crystal layer 3 from the color filter 230. The failure may be an after-image.

A first contact hole 185a may be disposed in each of the organic layer 180q and the color filter 230. The first contact hole 185a may expose the first drain electrode 175a. A second contact hole 185b may be disposed in each of the organic layer 180q and the color filter 230. The second contact hole 185b may expose the second drain electrode 175b.

A third contact hole 185c may be disposed in the organic layer 180q, the color filter 230, and the gate insulating layer 140. The third contact hole 185c may expose a part of a reference electrode 137 and a part of the third drain electrode 175c. The third contact hole 185c may be covered by a connection member 195. The connection member 195 may be configured to electrically connect the reference electrode 137 and the third drain electrode 175c. The reference electrode 137 is exposed through the third contact hole 185c.

Pixel electrodes 191 may be disposed on the organic layer 180q. The pixel electrodes 191 may correspond to the first pixel PX1 and the second pixel PX2. A first light blocking member 220a may be disposed on the organic layer 180q. The first light blocking member 220a may correspond to the color filter overlapped portion OV. The pixel electrodes 191 may be separated from each other. The gate line 121 may be disposed between the pixel electrodes 191. The pixel electrodes 191 may each include a first sub-pixel electrode 191a and a second sub-pixel electrode 191b. The first sub-pixel electrode 191a and the second sub-pixel electrode 191b may be adjacent to each other in a column direction with respect to the gate line 121.

The first sub-pixel electrode 191a and the second sub-pixel electrode 191b may be respectively physically and electrically connected with the first drain electrode 175a and the second drain electrode 175b, for example, through the first contact hole 185a and the second contact hole 185b. The first sub-pixel electrode 191a and the second sub-pixel electrode 191b may receive a data voltage from the first drain electrode 175a and the second drain electrode 175b, respectively. A part of the data voltage applied to the second drain electrode 175b may be divided by the third source electrode 173c. A magnitude of the voltage applied to the first sub-pixel electrode 191a may become relatively greater than a magnitude of the voltage applied to the second sub-pixel electrode 191b.

The first sub-pixel electrode 191a and the second sub-pixel electrode 191b applied with the data voltage may each generate an electric field with a common electrode 270 of the second display panel 200. Thus, a direction of liquid crystal molecules 31 of the liquid crystal layer 3 between the two electrodes 191 and 270 may be determined. The direction of the liquid crystal molecules 31 may affects luminance of light passing through the liquid crystal layer 3.

A second light blocking member 220b may be disposed in an area where the first thin film transistor Qa, the second thin film transistor Qb, the third thin film transistor Qc, and the first to third contact holes 185a, 185b, and 185c, are disposed. The second light blocking member 220b may extend in substantially the same direction as the gate line 121. Thus, the second light blocking member 220b may overlap a part of the data line 171.

The second light blocking member 220b may be disposed to overlap at least a part of the data lines 171 disposed at opposite sides of the first and second pixels PX1 and PX2. The second light blocking member 220b may reduce or prevent light leakage. Light leakage may occur from a portion where the data lines 171 and the gate line 121 overlap each other. The second light blocking member 220b may prevent light leakage in areas where the first thin film transistor Qa, the second thin film transistor Qb, and the third thin film transistor Qc are disposed.

The first alignment layer 11 may be disposed on each of the pixel electrode 191, the organic layer 180q, the first light blocking member 220a, and the second light blocking member 220b. The first alignment layer 11 may be a vertical alignment layer or a horizontal alignment layer.

The second display panel 200 will be described in more detail below.

The common electrode 270 may be disposed on a second substrate 210. A second alignment layer 21 may be disposed on the common electrode 270. The second alignment layer 21 may be a vertical alignment layer.

The liquid crystal layer 3 may have a negative dielectric anisotropy. Liquid crystal molecules 31 of the liquid crystal layer 3 may be substantially aligned so that long axes thereof are substantially perpendicular to the surfaces of the first display panel 100 and the second display panel 200 without applying an electric field.

The color filter array panel and the display device including the same may include the inorganic layer 180p. The inorganic layer 180p may be disposed between the color filter overlapped portion OV and the alignment layer 11. Thus, dispersion of ions to the alignment layer 11 from the color filter 230 may be reduced or prevented. Contamination of the alignment layer due to ions and a liquid crystal alignment failure due to the alignment layer contamination may be reduced or prevented.

While exemplary embodiments of the present invention have been described in connection with what is presently considered to be example embodiments, it is to be understood that the present invention is not limited to the disclosed exemplary embodiments, but, on the contrary, is intended to cover various modifications and equivalent arrangements included within the spirit and scope of the present invention.

What is claimed is:

1. A color filter array panel, comprising:
a substrate;
a first pixel and a second pixel adjacent to each other;
a data line on the substrate and between the first pixel and the second pixel;
a first color filter in the first pixel;
a second color filter in the second pixel, the first color filter and the second color filter overlapping each other in a color filter overlapped portion, the color filter overlapped portion overlapping the data line;
an inorganic layer on the color filter overlapped portion;
an organic layer on the inorganic layer, the first color filter, and the second color filter; and
a first pixel electrode and a second pixel electrode on the organic layer,
wherein the first pixel electrode is in the first pixel and the second pixel electrode is in the second pixel,
wherein the inorganic layer is between the first pixel electrode and the second pixel electrode, and
wherein the inorganic layer does not overlap the first pixel electrode and the second pixel electrode.

2. The color filter array panel of claim 1, wherein a first thickness of a first portion of the organic layer overlapping each of the first pixel electrode and the second pixel electrode is larger than a second thickness of a second portion of the organic layer overlapping the color filter overlapped portion.

3. The color filter array panel of claim 2, wherein the inorganic layer comprises a silicon oxide ($SiO_x$), a silicon nitride ($SiN_x$), or tetraethyl orthosilicate (TEOS).

4. The color filter array panel of claim 2, wherein the organic layer comprises an acryl-based resin a or siloxane resin.

5. The color filter array panel of claim 2, further comprising an alignment layer on the first pixel electrode, the second pixel electrode and the organic layer.

6. A display device, comprising:
a first display panel;
a second display panel facing the first display panel; and
a liquid crystal layer between the first display panel and the second display panel,
wherein the first display panel comprises:
a substrate;
a data line on the substrate; and
a first color filter and a second color filler on the substrate, wherein
the first color filter is in a first pixel and the second color filter is in a second pixel,
the first pixel and the second pixel are adjacent to each other, the data line is between the first pixel and the second pixel, and
the first color filter and the second color filter overlap each other in a color filter overlapped portion, the color filter overlapped portion overlaps the data line;
an inorganic layer on the color filter overlapped portion;
an organic layer on the inorganic layer, the first color filter, and the second color filter; and
a first pixel electrode and a second pixel electrode on the organic layer,
wherein the first pixel electrode is in the first pixel and the second pixel electrode is in the second pixel,
wherein the inorganic layer is between the first pixel electrode and the second pixel electrode, and
wherein the inorganic layer does not overlap the first pixel electrode and the second pixel electrode.

7. The display device of claim 6, further comprising:
a first alignment layer between the first display panel and the liquid crystal layer; and
a second alignment layer between the second display panel and the liquid crystal layer.

8. The display device of claim 7, wherein a first thickness of a first portion of the organic layer overlapping each of the first pixel electrode and the second pixel electrode is larger than a second thickness of a second portion of the organic layer overlapping the color filter overlapped portion.

9. The display device of claim 8, wherein the inorganic layer comprises a silicon oxide ($SiO_x$), a silicon nitride ($SiN_x$), or tetraethyl orthosilicate (TEOS).

10. The display device of claim 8, wherein the organic layer comprises an acryl-based resin, or a siloxane resin.

11. A color filter array panel, comprising:
a substrate;
a first pixel and a second pixel adjacent to each other;
a first color filter in the first pixel;
a second color filter in the second pixel, the first color filter and the second
color filter overlapping each other in a color filter overlapped area;
an inorganic layer on the second color filter in the color filter overlapped
area;
an organic layer on the inorganic layer, the first color filter, and the second color filter;
a first pixel electrode in the first pixel and a second pixel electrode in the
second pixel,
wherein a first thickness of a first portion of the organic layer overlapping
each of the first pixel electrode and the second pixel electrode is larger than a second thickness of a second portion of the organic layer in the color filter overlapped area, and
wherein the inorganic layer does not overlap the first pixel electrode and the second pixel electrode.

12. The color filter array panel of claim 11, wherein the inorganic layer comprises an inorganic insulating material.

13. The color filter array panel of claim 11, wherein the organic layer comprises an acryl-'based resin or a siloxane resin.

14. The color filter array panel of claim 11, further comprising a data
line between the first pixel and the second pixel.

15. The color filter array panel of claim 14, wherein the data line is included in the color filter overlapped area.